(12) United States Patent
Janik (10) Patent No.: US 6,911,143 B2
(45) Date of Patent: Jun. 28, 2005

(54) BASE RECEPTACLE FOR FILTER CARTRIDGE INCORPORATING A PERIPHERAL COMPATIBILITY MATRIX

(75) Inventor: Leon P. Janik, Suffield, CT (US)

(73) Assignee: Stanadyne Corporation, Windsor, CT (US)

( * ) Notice: Subject to any disclaimer, the term of this patent is extended or adjusted under 35 U.S.C. 154(b) by 72 days.

(21) Appl. No.: 10/284,686

(22) Filed: Oct. 31, 2002

(65) Prior Publication Data

US 2004/0084360 A1 May 6, 2004

(51) Int. Cl.[7] .............................................. B01D 35/30
(52) U.S. Cl. ..................... 210/232; 210/249; 210/443
(58) Field of Search ............................... 210/249, 440, 210/443, 444, 232, 438; 285/330, 386, 913, 914

(56) References Cited

U.S. PATENT DOCUMENTS

| | | | |
|---|---|---|---|
| 5,035,797 A | | 7/1991 | Janik ........................ 210/232 |
| 5,186,829 A | * | 2/1993 | Janik ........................ 210/232 |
| 5,474,676 A | * | 12/1995 | Janik et al. ................ 210/249 |
| 5,766,463 A | | 6/1998 | Janik et al. ................ 210/232 |
| 5,837,137 A | | 11/1998 | Janik ........................ 210/232 |
| 6,048,455 A | | 4/2000 | Janik ........................ 210/232 |
| 6,116,658 A | * | 9/2000 | Bohlen ...................... 285/330 |
| 6,187,188 B1 | | 2/2001 | Janik et al. ................ 210/232 |

FOREIGN PATENT DOCUMENTS

| | | |
|---|---|---|
| EP | 0 529 782 A1 | 3/1992 |
| EP | 0 972 554 A1 | 1/2000 |
| EP | 1 070 530 A1 | 1/2001 |

OTHER PUBLICATIONS

International Search Report PCT/US 03/33467, dtd. Oct. 21, 2003.

* cited by examiner

*Primary Examiner*—Matthew O. Savage
(74) *Attorney, Agent, or Firm*—Alix, Yale & Ristas, LLP (57) ABSTRACT

A filter assembly employs radially inwardly and outwardly displaced portions of a peripheral roll seam on the cartridge as components of a cartridge compatibility matrix. A substantially annular space, the radial configuration of which varies with the convoluted roll seam, is defined between the roll seam and a cylindrical wall of the cartridge end cap. The base includes an axially projecting receptacle wall that terminates in a coded lip to define a receptacle for receiving the cartridge end cap. The cartridge mounting system requires axial reception of the coded lip into the substantially annular space of the filter cartridge. The coded lip is configured to block reception and mating of any filter cartridge whose roll seam defines a substantially annular space of incompatible radial configuration. The number, configuration and location of inwardly and outwardly displaced portions of the roll seam may be varied to provide a variety of unique compatibility matrices.

16 Claims, 10 Drawing Sheets

BASE RECEPTACLE FOR FILTER CARTRIDGE INCORPORATING A PERIPHERAL COMPATIBILITY MATRIX

BACKGROUND OF THE INVENTION

1. Field of the Invention

This invention relates generally to fuel filters employed in connection with internal combustion engines. More particularly, the present invention relates to a base receptacle which receives a replaceable fuel filter cartridge to form a filter assembly for removing foreign particles and/or separating water from the fuel supply system of an internal combustion engine.

2. Description of the Related Art

Fuel filter systems to which the invention relates commonly employ a disposable filter cartridge that is replaced at pre-established intervals of filter usage. The replaceable cartridge is conventionally secured to a base that defines inlet and outlet connections between the cartridge and the fuel supply system. Numerous retention systems have been employed for securing the filter cartridge to the base and allowing removal of the cartridge for replacement purposes.

In practice, filter cartridge requirements may vary depending upon: the type and make of the internal combustion engine; the specific application for which the engine is employed; the climate in which the engine is operated; and/or regional characteristics as to the quality of the fuel supply. Filter cartridges suitable for replacement in a particular filtration system, commonly vary as to capacity, fluid compatibility and filter media qualities.

One of the recurring problems in assuring filtration system performance is encountered in connection with replacement of the filter cartridge. It is imperative that the replacement cartridge be compatible with the filtering requirements for the fuel system. It is common for filter cartridges to have a generally similar exterior configuration regardless of performance. As a result, a replacement filter cartridge may dimensionally conform to the base of a given fuel filter assembly, and not comply with the applicable specifications for the fuel system and thereby jeopardize the integrity of the fuel filtering system. Replacement with an incompatible filter cartridge can have very serious consequences for the operation of the internal combustion engine and may also be unnecessarily more expensive than less costly cartridges which are fully suitable. In practice, replacement cartridges may be so similar in overall configuration that the owner of the vehicle and/or the maintenance technician servicing the internal combustion engine may unknowingly jeopardize the integrity of the filtering system by replacement with a wholly unsuitable cartridge even though the unsuitable cartridge at least cursorily appears to be suitable. There are also, of course, instances where inferior or improper replacement filter cartridges are intentionally installed without the knowledge of the owner or the operator of the vehicle.

For many applications, it is also desirable that a cartridge be mounted to the base at a specific angular orientation so that warnings, directions and markings affixed to the cartridge may be properly positioned to ensure visibility and maximize the chances of successful information dissemination. For other applications, it is desirable that the cartridge be locked in position relative to the base such that the cartridge may not rotate with relation to the base.

U.S. Pat. No. 5,035,797, which is assigned to the assignee of the present invention, discloses a fuel filter assembly in which a base mounts to the vehicle and a disposable filter cartridge is suspended from the base. The cartridge is retained to the base by a threaded collar that engages against a protruding roll seam structure at the periphery of the cartridge housing. The cartridge is replaced by loosening the threaded collar and dismounting the filter cartridge. A key system is disclosed in which keys axially project from the base through corresponding slots in the end cap of the filter cartridge housing. The dimensions and location of the axially projecting keys ensure compatibility by interfering with mounting and sealing of incompatible cartridges lacking the correct slot configuration. The keys interlock with the slots to mount the cartridge at a fixed angular relationship to the base.

U.S. Pat. No. 5,837,137, which is assigned to the assignee of the present invention, discloses a similarly configured fuel filtration assembly (e.g., the cartridge is retained to the base by a threaded collar) incorporating an alternative location and key system. Protrusions from a receiving surface of the base are received in corresponding dimples in the opposing end surface of the cartridge to lock the cartridge at a fixed angular position relative to the base. The protrusions interfere with the mounting and sealing of a non-compatible cartridge having an incompatible pattern of dimples.

A further variation on ensuring compatibility in fuel filtration assemblies similar to those described above is disclosed in U.S. Pat. No. 5,766,463, which is assigned to the assignee of the present invention. The disclosed fuel filter cartridge is formed from a pair of shell sections joined along a roll seam to form the retaining shoulder. The generally cylindrical upper portion of the filter cartridge is received within the base. A plurality of arcuate protrusions radially project from the cylindrical upper portion of the cartridge to be received in compatible tracks in the base. The protrusions are disclosed as part of a key code system including the key/slot system described in the '797 patent. A keying system that relies on protrusions from the received portion of the cartridge housing may permit defeat of the keying system by allowing a cartridge without the protrusions to be received in the keyed base without interference.

An alternative filter cartridge mounting system is disclosed in U.S. Pat. No. 6,187,188, also assigned to the assignee of the present invention. The roll seam at the junction of the cartridge housing sections is radially outwardly displaced to form a plurality of retention tabs. The base includes a fixed retaining structure comprising a retaining lip defining a plurality of axial slots in communication with retaining channel portions above the retaining lip. The axial slots are located and dimensioned to be complementary to the retaining tabs of the filter cartridge. The filter cartridge is retained to the base by axially aligning the tabs with the slots and upwardly displacing the cartridge into the receptacle of the base. The cartridge is then rotated so that the tabs are engaged within the retaining channel portions. The '188 patent discloses that compatibility of the cartridge with the base may be ensured by providing the received portion of the cartridge with arcuate slots to accommodate keys axially projecting from the base as disclosed in the '797 patent. Alternatively, the received portion of the cartridge may be provided with radial protrusions such as those disclosed in the '463 patent. Tracks in the base for receiving the protrusions must be substantially L-shaped (have an axial portion and a radial portion) to accommodate rotation of the cartridge relative to the base.

Ensuring filter cartridge compatibility is an issue of continuing concern in the art. While the approaches to ensuring filter cartridge compatibility described in the '797, '137, '463, and '188 patents represent significant advances over the prior art, further improvements in effectiveness and efficiency are possible. For example, keys projecting from the base that require openings in the filter cartridge compromise the sealed integrity of the filtration system. Keying arrangements that restrict the cartridge to a fixed angular position relative to the base are incompatible with filter assemblies that require rotation of the cartridge relative to the base. The L-shaped tracks disclosed in the '188 patent may be difficult to produce, thereby increasing the cost of filter assemblies.

There is an ongoing need in the art for a filter assembly that prevents installation of incompatible filter cartridges. Ideally, a filter cartridge compatible with such a key system may be employed with a filter assembly in which the cartridge is retained to the base by a collar and filter assemblies in which the cartridge is rotated to engage radially projecting tabs in a retainer fixedly extending from the base.

SUMMARY OF THE INVENTION

Briefly stated, the invention relates to a filter assembly that includes a replaceable filter cartridge with a housing that defines a substantially annular space between a convoluted peripheral roll seam and an end cap housing portion of reduced diameter. A cylindrical wall of the base axially terminates in a lip configured to axially penetrate the substantially annular space defined by the convoluted roll seam. The convoluted roll seam and lip define a compatibility matrix that prevents installation of an incompatible filter cartridge.

In one embodiment of the filter cartridge, the roll seam includes portions or segments that are outwardly and inwardly displaced relative to the remainder of the generally circular roll seam. The inwardly and outwardly displaced portions of the roll seam change the radial dimension of the space between the roll seam and the generally cylindrical wall of the end cap. The resulting substantially annular space has portions with a first reduced radial dimension adjacent the inwardly displaced segments of the roll seam, portions with a second, intermediate radial dimension adjacent non-displaced portions of the roll seam and portions with a third, enlarged radial dimension adjacent outwardly displaced portions of the roll seam.

A base receives the end cap of the cartridge housing in a receptacle defined by an axially projecting wall. In a first embodiment of the filter base, the receptacle wall axially terminates in a lip having a radial (sectional) configuration keyed to the configuration of the substantially annular space defined by the cartridge. The base is coded or keyed to receive compatible cartridges by conforming the sectional configuration of the lip on the receptacle wall to the configuration of the substantially annular space defined between the convoluted roll seam and the end cap of the filter cartridge. An incompatible or incorrectly keyed filter cartridge is rejected from reception and mating with the base as will be further disclosed below.

The filter cartridge housing may be substantially symmetric about a central axis with three equal size outwardly displaced portions equiangularly arranged about the cartridge axis. Consequently, the roll seam includes three substantially equal length portions of the substantially the same radii of curvature extending between the outwardly displaced portions. One or more of these intermediate roll seam portions may include a segment that is inwardly displaced relative to the remainder of the roll seam. The number, dimensions and arrangement of the inwardly and outwardly displaced portions of the roll seam may be altered to ensure cartridge/base compatibility and index a received cartridge to a particular rotational position when mated to the base.

A retaining collar passes over the larger diameter end of the filter cartridge housing to engage the roll seam of the filter cartridge. In one embodiment of a filter assembly, inwardly projecting structures on the collar mate with outwardly projecting structures on the outside surface of the receptacle wall. When installed, the retaining collar provides a removable connection between the roll seam of the cartridge and the base. Installation of the collar requires axial entry of the receptacle wall lip in the annular space of the cartridge housing.

An object of the present invention is to provide a new and improved filter cartridge compatibility matrix.

Another object of the present invention is to provide a new and improved filter cartridge structure that ensures compatibility in filter assemblies having fixed and movable cartridge-retention systems.

A further object of the present invention is to provide a new and improved filter assembly in which compatibility protection cannot be defeated by omission of the compatibility matrix structure from the cartridge.

Other objects and advantages of the invention will become apparent from the drawings and the specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENTS

Figure 12:
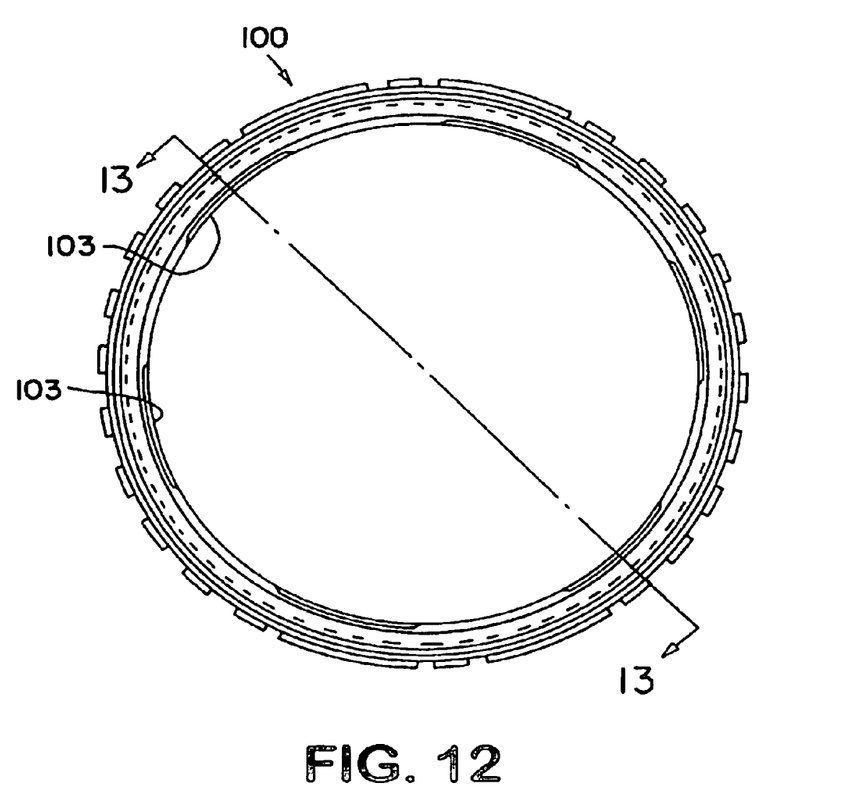
FIG. 12 is bottom view, partly in phantom, of a retaining collar for retaining the filter cartridge of FIG. 1 to the base component of FIG. 6.
Figure 13:
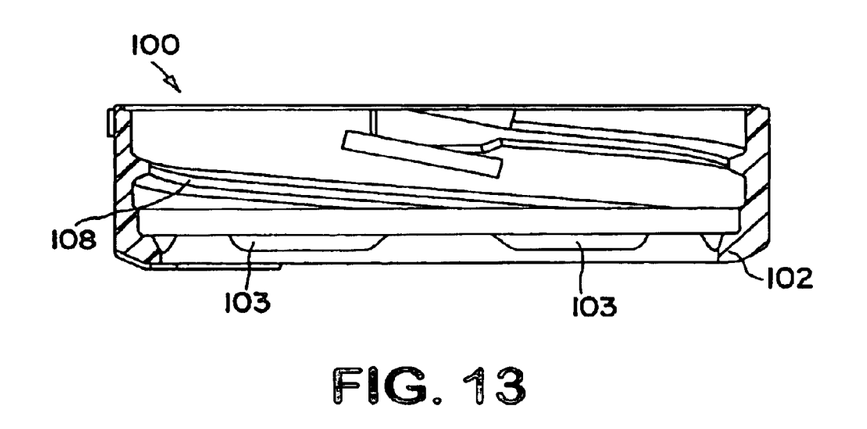
FIG. 13 is a sectional view of the collar of FIG. 8, taken along line 13—13 thereof.

A filter cartridge compatible with a filter base in accordance with the present invention will be described with reference to FIGS. 1–5 and is generally designated by the numeral 10. An embodiment of a filter base component compatible with the cartridge of FIGS. 1–5 is shown in FIGS. 6–11 and is generally designated by the numeral 80. An embodiment of a retaining collar appropriate for securing the filter cartridge 10 to the base component 80 is shown in FIGS. 12 and 13 and is generally designated by the numeral 100.

Figure 1:
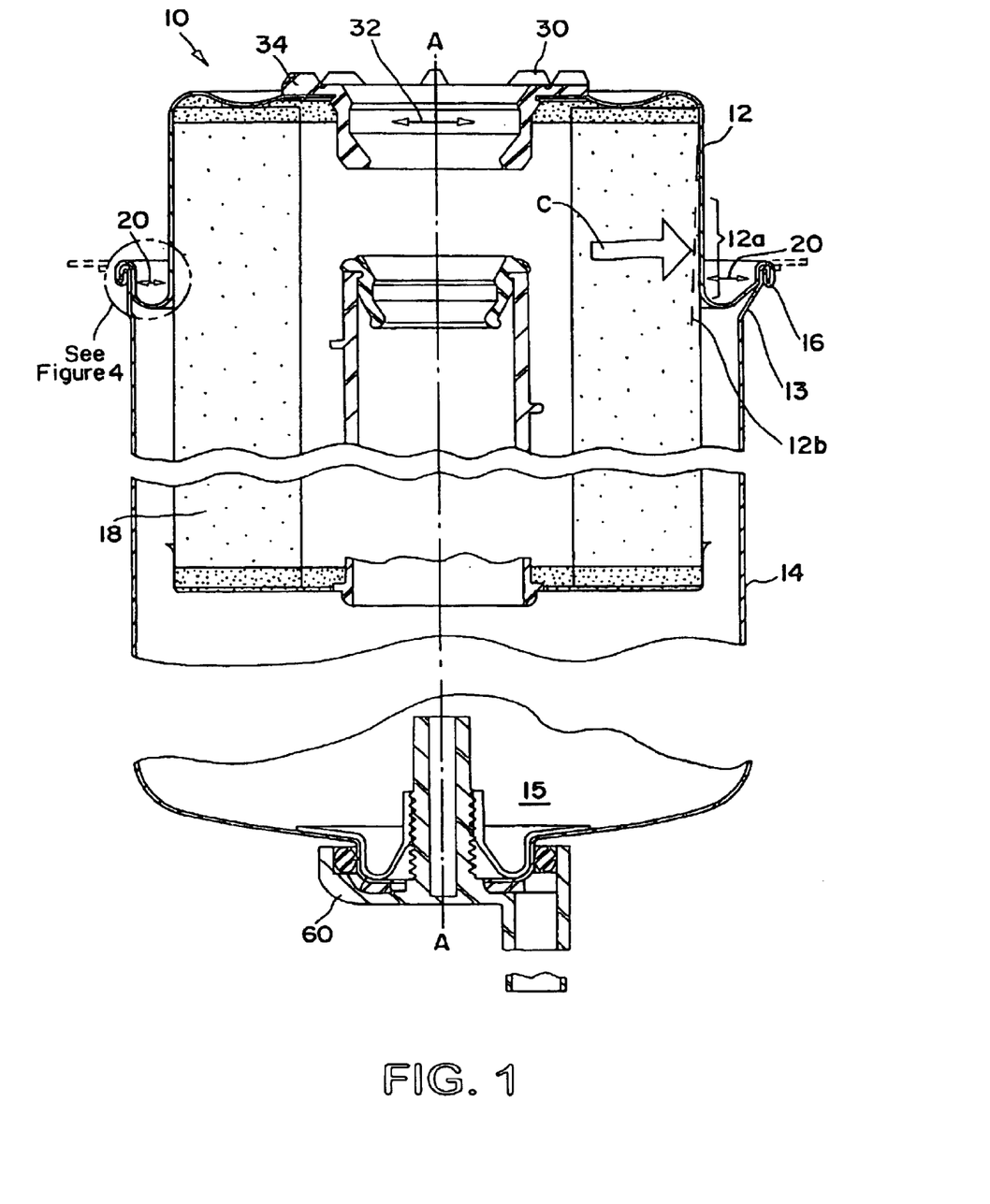
FIG. 1 is a vertical sectional view, partly broken away, of a fuel filter cartridge incorporating a compatibility matrix exemplary of several aspects of the present invention.
Figure 4:
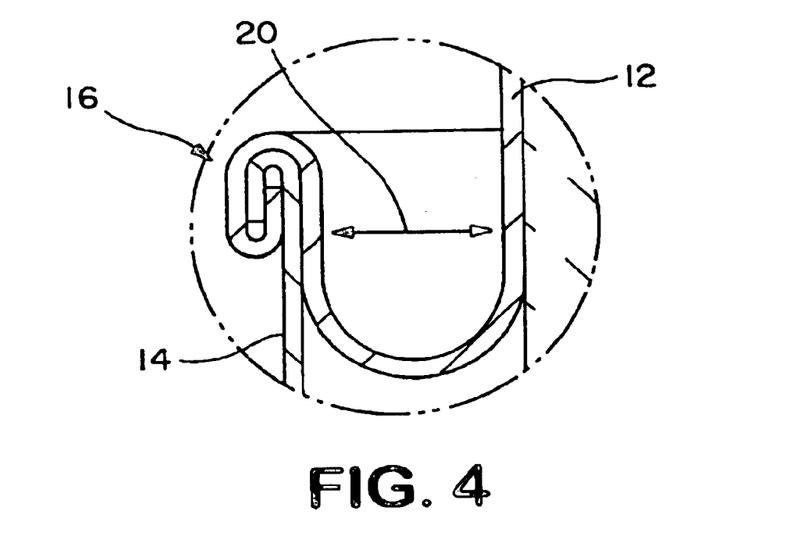
FIG. 4 is an enlarged sectional view through the roll seam at the left side of the filter cartridge of FIG. 1.

FIG. 1 is a sectional view through a filter cartridge 10 comprising a first housing section 12 joined to a second housing section 14 along a peripheral roll seam 16. FIG. 4 illustrates an enlarged sectional view through the roll seam 16 on the left hand side of FIG. 1. The sheet metal of the respective housing sections which forms the roll seam is shown as dotted lines to the left and right of the filter cartridge 10 adjacent the roll seam in FIG. 1. The sheet metal extending from the housing first section 12 extends radially beyond the sheet metal of extending from the housing second section 14. When rolled together to form the roll seam shown in FIG. 4, the extended radial length of the sheet metal of the housing first section 12 is rolled under and overlaps the sheet metal of the housing second section 14. The rolled, overlapping sheet metal is then crimped to form the roll seam in a manner known in the art. A U-shaped bend in the housing first section 12 inwardly of the roll seam defines a space 20 between the roll seam and the housing first section 12. This space 20 allows access to the interior of the roll seam 16 during seam formation and for the purposes of deformation as will be discussed below.

The filter cartridge 10 has an overall general configuration and functionality that is well understood by those of skill in the art. A filter element 18 is supported within the filter cartridge. A grommet 30 surrounds an axial opening 32 in the housing first section 12 that receives coaxial conduits (not shown) for delivery of unfiltered fluid and retrieval of filtered fluid from the filter cartridge 10. The housing second section 14 may be provided with a drain cock 60 for removal of water that may accumulate in a sump 15 defined by the lower portion of the housing second section 14.

Figure 2:
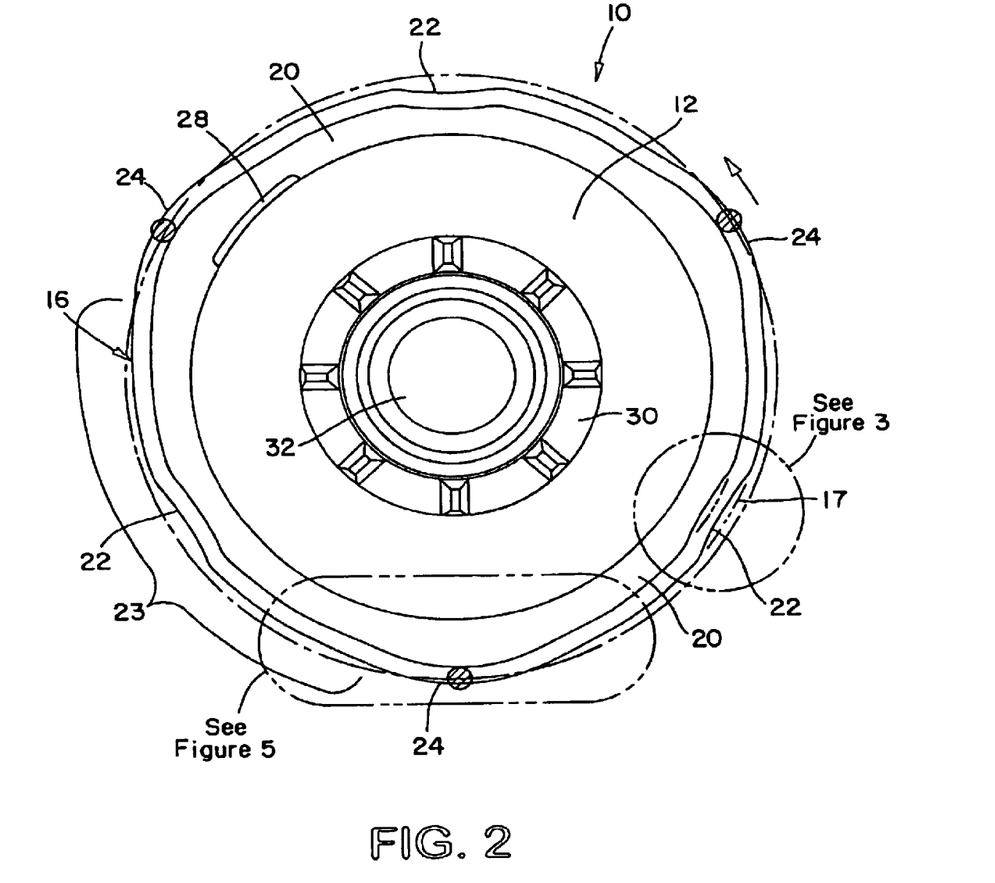
FIG. 2 is a top plan view of the filter cartridge of FIG. 1.

FIG. 2 is a top view of the filter cartridge of FIG. 1. The roll seam 16 circumscribes the filter cartridge 10 radially separated from the housing first section 12 to define an annular space 20. The roll seam 16 includes three portions that are radially outwardly displaced relative to the central axis A of the cartridge to form retention tabs 24. The retention tabs 24 are illustrated as being equiangularly arranged on the circumference of the roll seam and of equal angular extent and radial displacement. Three roll seam portions 23 extend between the retention tabs 24. In the illustrated embodiment, each of these portions 23 of the roll seam include a radially inwardly displaced segment 22. The inwardly displaced segments 22 provide one variable for use in conjunction with a cartridge compatibility matrix. The inwardly displaced segments 22 of the roll seam 16 on the exemplary filter cartridge 10 are diametrically opposed to each retention tab 24.

The inward and outward displacement of the roll seam relative to its generally circular shape result in a peripheral shoulder with a serpentine configuration. This complex shape is advantageously located at the radial outer periphery of the filter cartridge. As will be discussed in greater detail below, a compatibility matrix including a serpentine, or convoluted outer periphery of the filter cartridge presents unique opportunities for blocking reception of cartridges omitting portions of the compatibility matrix. Further, inward and outward displacement of the roll seam 16 relative to the central axis A of the cartridge defines an annular space 20 having a variable radial dimension when measured perpendicular to the cartridge axis A, as best seen in FIG. 2. The shape of the annular space 20 may be used as part of a cartridge compatibility matrix when the cartridge 10 is mounted to a base including the component shown in FIGS. 6–11 by the collar shown in FIGS. 12 and 13. In accordance with a further aspect of the present invention, the outer profile of the roll seam 16 may used as a constituent of a cartridge compatibility matrix in other base embodiments where the roll seam is axially received by a fixed retaining structure.

Figure 3:
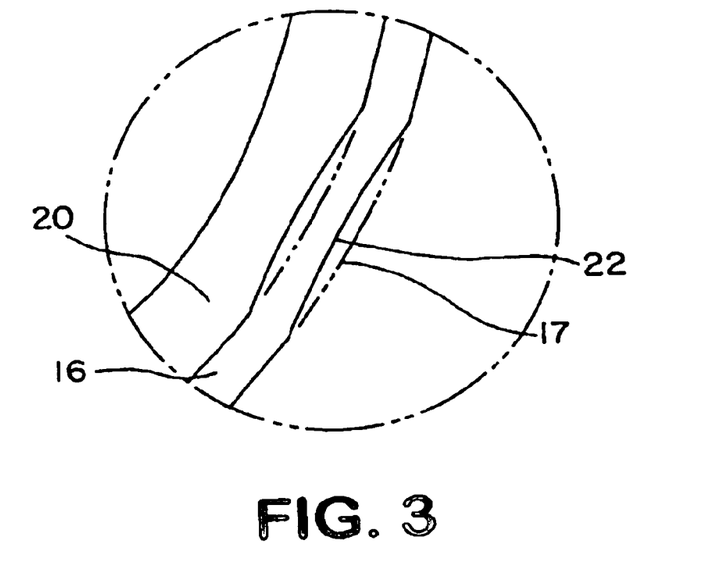
FIG. 3 is an enlarged view, partly in diagrammatic form, of an inwardly displaced segment of the roll seam of the filter cartridge of FIG. 2.

FIG. 3 illustrates an enlarged view of an inwardly displaced segment 22 of the roll seam 16. In the illustrated embodiment, the inward displacement of the roll seam is in the form of an arc having a radius of curvature of approximately 2.5" and a center of curvature located outside the roll seam 16. The inward deformation displaces the roll seam 16 inwardly from its normal radius of curvature 17 (illustrated by the dashed line in FIG. 3) by a distance in the range of 0.02" to 0.05" at the center of the deformation. The inwardly displaced segment has a length of approximately 0.5" measured along the circumference of the roll seam.

Figure 5:
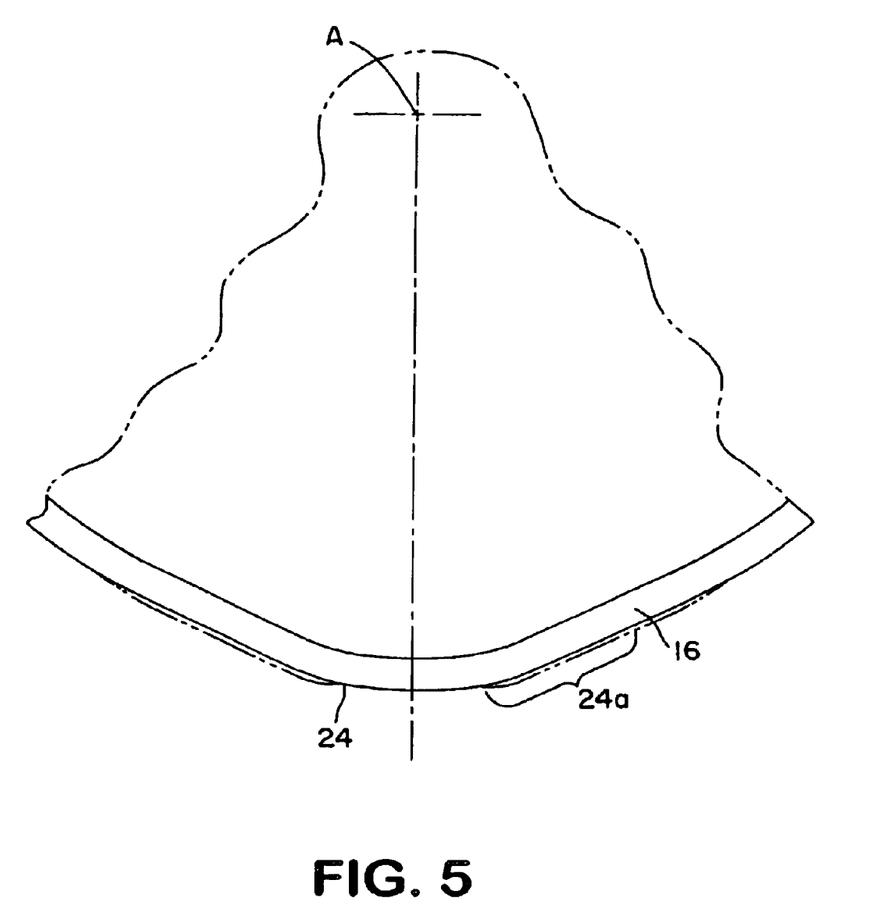
FIG. 5 is an enlarged portion, partly in diagrammatic form, of the filter cartridge shown in FIG. 2 illustrating a retention tab formed from an outward deformation of the roll seam.

FIG. 5 is an enlarged portion of FIG. 2 illustrating the outward displacement of the roll seam 16 to form a retention tab 24. The roll seam is radially outwardly displaced by a distance of approximately 0.08" relative to adjacent portions of the roll seam or a distance approximately equivalent to the radial thickness of the roll seam 16. Each retention tab 24 of the illustrated embodiment maintains its maximum outward displacement (of approximately one roll seam thickness) for approximately 0.5". It will be appreciated that the roll seam 16 includes transitional portions 24a adjacent either end of the retention tabs. The roll seam 16 between the retention tabs 24 (including their transitional portions 24a) and the inwardly displaced segments 22 maintains a substantially constant radius of curvature centered on the cartridge axis A.

It should be noted that inward and outward displacement of the roll seam may alter the configuration of the filter cartridge end cap 12 and second section 14. As best seen in the right-hand portion of FIG. 1, the housing second section 14 is displaced outwardly at 13 adjacent the outwardly displaced portion 24 of the roll seam 16. Further, outward displacement of the roll seam 16 causes a portion 12a of the generally cylindrical wall of the end cap 12 to be displaced outwardly as indicated by arrow C relative to a line 12b parallel to central axis A. The outward deformation of the end cap 12 increases as the cylindrical wall axially progresses toward the housing second section 14 (see FIG. 1). This outward deformation of the end cap 12 is greatest at the center of the outwardly displaced portions 24 of the roll seam 16. As a result, the wall of the end cap 12 is deformed to a non-cylindrical configuration in which the wall tapers gradually outwardly at locations centered on each outwardly displaced portion 24 of the roll seam 16. There are three such outward deformations 12a in the illustrated embodiment 10.

FIGS. 6–11 illustrate a representative embodiment of a base component 80 configured to receive the cartridge illustrated in FIGS. 1–5. The filter base comprises a cast or molded component 80 with a generally cylindrical receptacle wall 92 defining a receptacle 87 into which the end cap 12 of the cartridge housing is axially receivable. The cartridge 10 is retained to the base by a collar 100 (illustrated in FIGS. 12 and 13).

In accordance with an aspect of the present invention, the receptacle wall 92 axially terminates in a lip 82. The lip 82 is provided with a sectional configuration (best seen in FIG. 9) complementary to the radial dimensions of the annular space 20 defined between the end cap 12 of the cartridge housing and the roll seam 16. Radial outward projections 84 of the lip 82 correspond to the location and general configuration of the radially outward displaced portions 24 of the roll seam 16. The base component 80 may be cast with locations 86 where the lip 82 is thinned or notched to accommodate inwardly displaced segments 22 of the roll seam 16. Alternatively, lip material may be removed after production of the base component 80, such as by machining the lip 82 at locations 86. In the illustrated base component 80, the lip 82 with its cartridge compatibility elements 84, 86 occupies an axial end portion 83 of the receptacle wall 92 as best seen in FIGS. 6–8 and 11. This axial end portion 83 has an axial length of approximately 0.2" in the illustrated embodiment.

Figure 6:
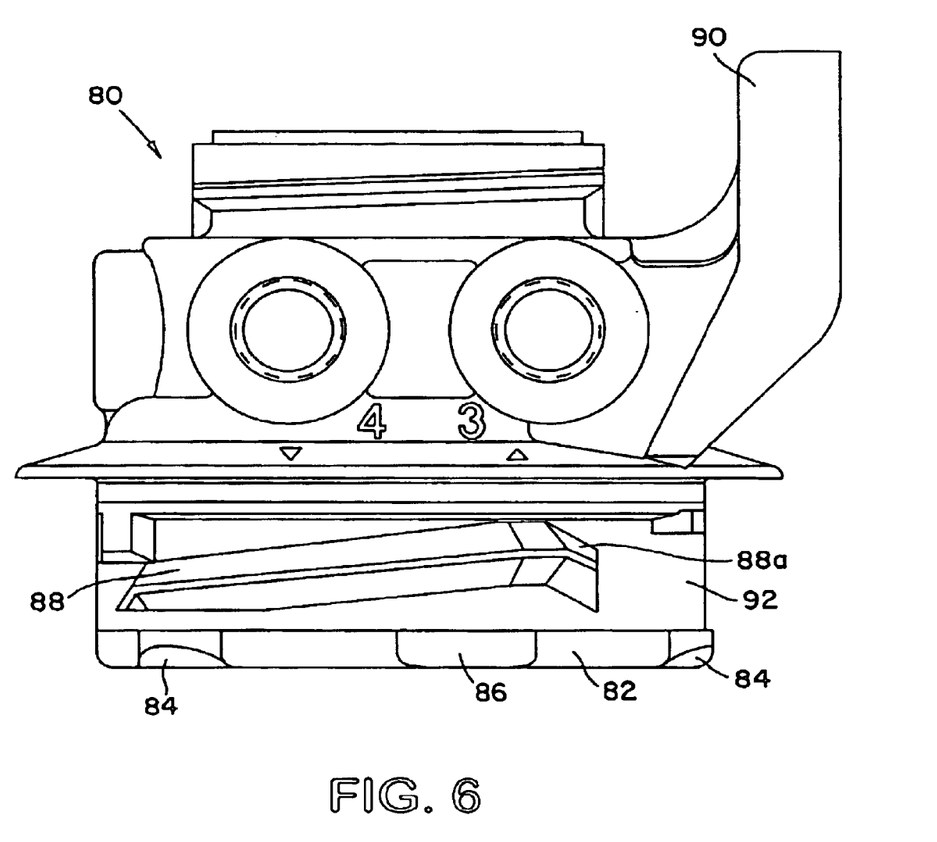
FIG. 6 is a side view of a filter base component configured to receive the filter cartridge of FIG. 1.
Figure 7:
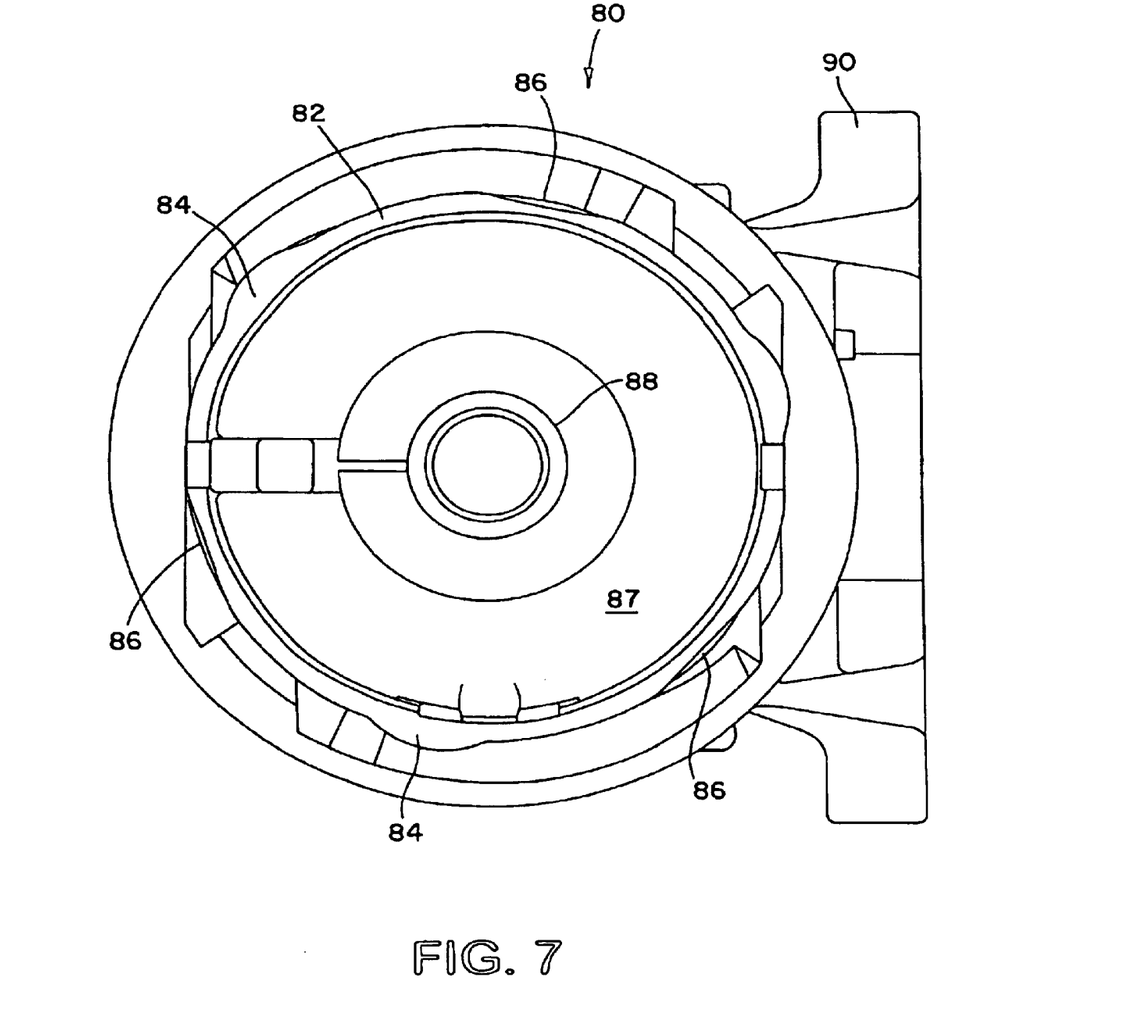
FIG. 7 is a bottom view of the filter base component of FIG. 6.
Figure 8:
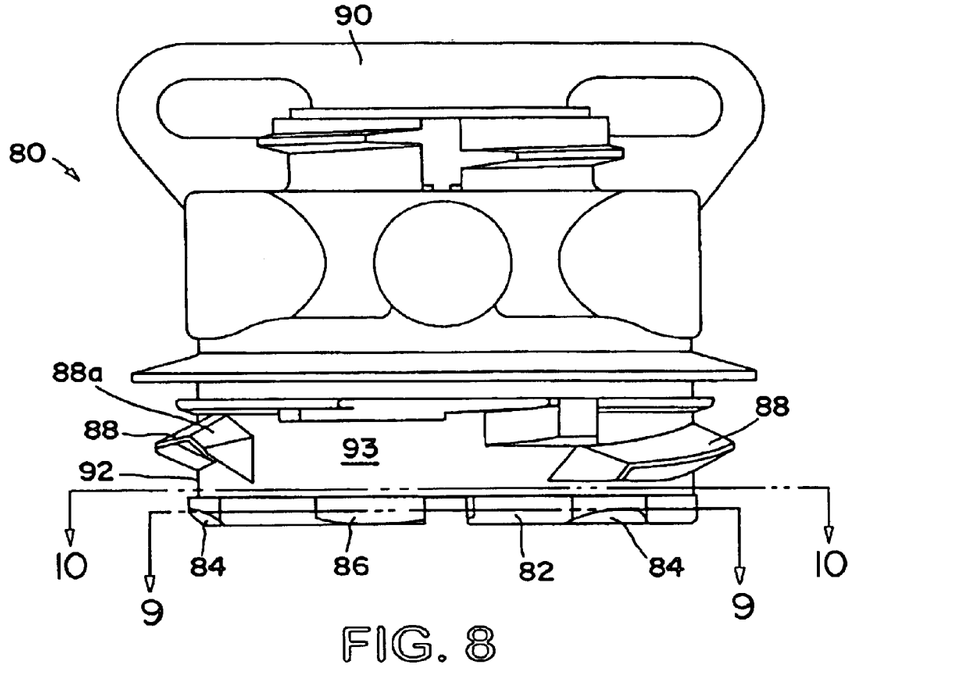
FIG. 8 is a front view of the filter base component of FIG. 6.
Figure 9:
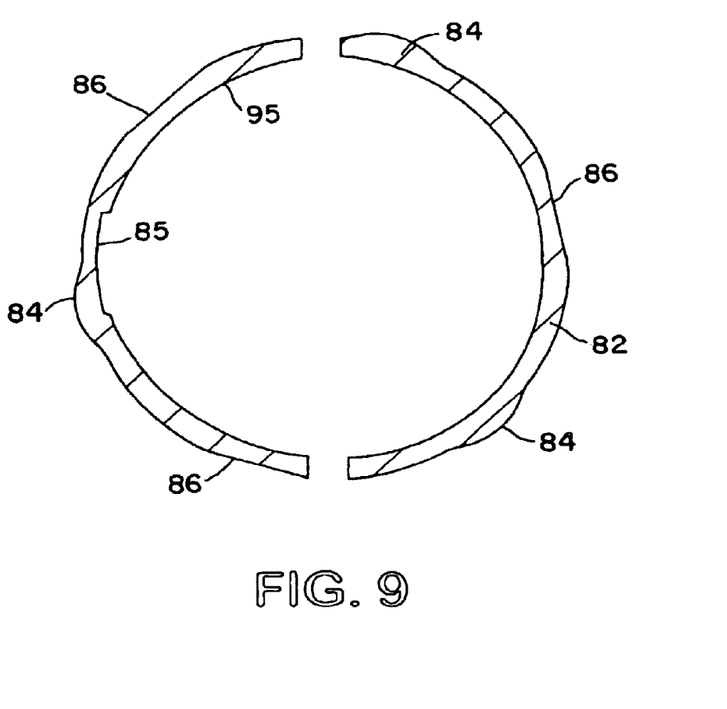
FIG. 9 is a sectional view, partly in diagrammatic form, of the filter base component of FIG. 8, taken along line 9—9 thereof.
Figure 10:
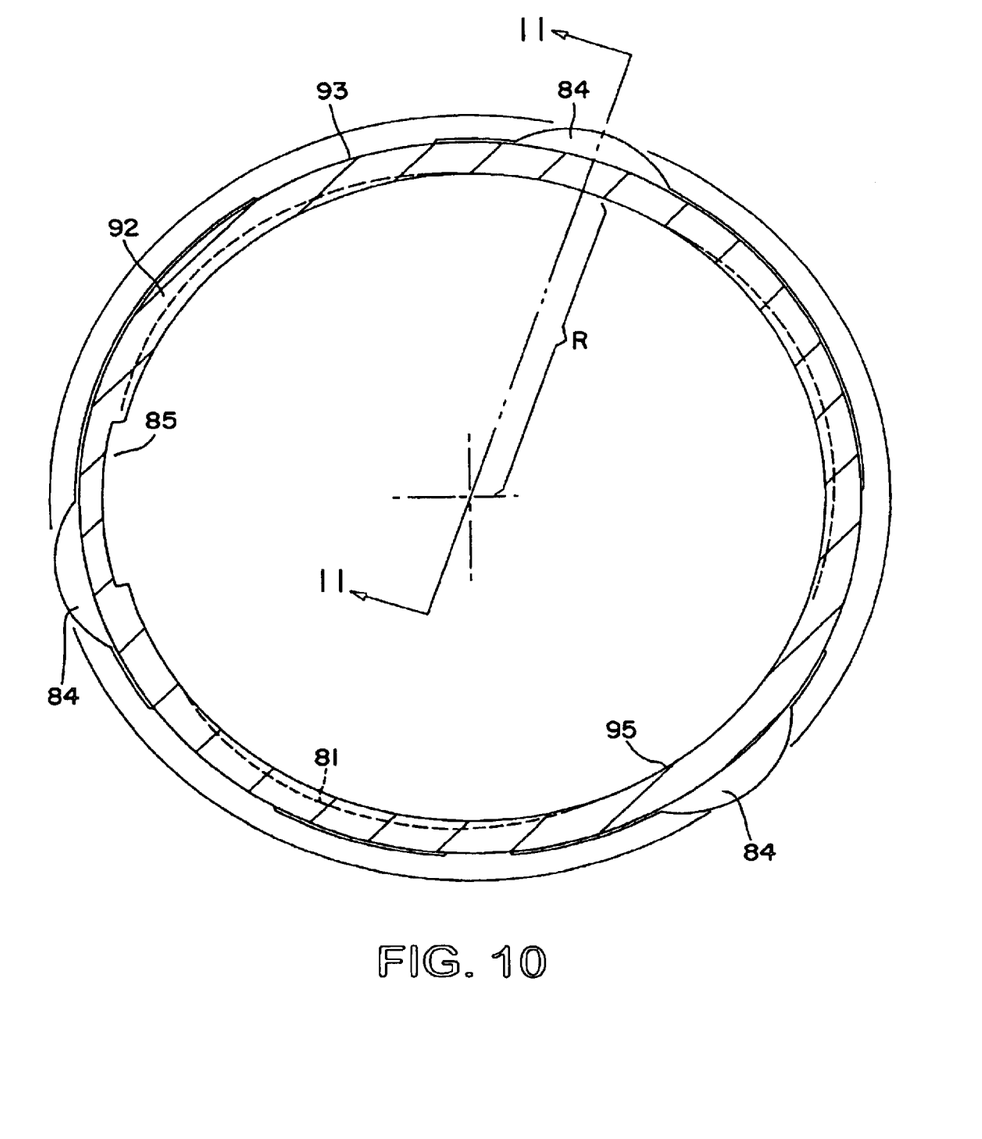
FIG. 10 is a sectional view, partly in diagrammatic form, of the filter base component of FIG. 8, taken along line 10—10 thereof.

FIGS. 6–8, 10 and 11, illustrate the configuration of the receptacle wall 92. FIGS. 6–8 are side, bottom and front views of the representative base component 80. An outside surface 93 of the receptacle wall 92 may include a pair of integral outwardly projecting diametrically opposed ramps 88 that ascend spiral-like around the base component 80. The upper ends 88a of the ramps 88 are beveled. FIGS. 7 and 9–11 illustrate the configuration of the inside surface 95 of the receptacle wall 92. The inside surface 95 of the receptacle wall 93 may be noncircular as best illustrated in FIG. 10. Relative to a circle 81, the inside surface 95 of the receptacle wall 93 is noncircular, reaching a maximum radial dimension R centered on the outward projections 84 of the lip 82. This noncircular configuration of the inside surface 95 of the receptacle wall 93 may be provided to accommodate the noncircular shape of the end cap 12 of the filter cartridge housing discussed above.

Figure 11:
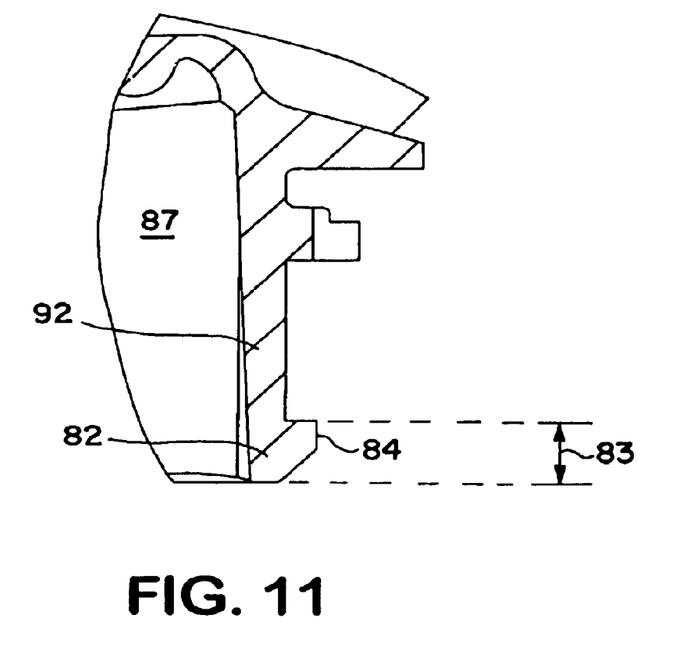
FIG. 11 is partial sectional view, partly in diagrammatic form, of the filter base component of FIG. 8, taken along line 11—11 of FIG. 10.

With reference to FIG. 11, it will be noted that the noncircular formation of the inside surface 95 of the receptacle wall 93 tapers from a maximum adjacent the lip 82 to a minimum as the receptacle wall 92 progresses toward the header of the base component 80. This tapered and noncircular configuration corresponds to the tapered and noncircular configuration of the housing end cap 12 as discussed above. Although not illustrated herein, the noncircular configuration of the filter cartridge housing end cap 12 may alternatively be accommodated by a cylindrical receptacle wall inside surface of a diameter slightly greater than would ordinarily be required. This diameter may be calculated to further provide an interference or frictional engagement between the end cap of the filter cartridge and the inside surface of the receptacle wall.

As best shown in FIG. 9, the combination of a shaped (non-cylindrical) inside surface 95 and coded lip 82 exterior profile including radial projections 84 and locations 86 of removed material provide a complex sectional shape to the lip 82 of the receptacle wall 92. This complex sectional shape reflects the complex radial dimensions of the space 20 defined between the convoluted roll seam 16 and the cartridge housing end cap 12. The axial tracks 85 on the inside surface 95 of the receptacle wall add additional elements to the cartridge compatibility matrix defined by the coded lip 82 of the receptacle wall 92. Those of skill in the art will observe that it is possible to rotate the pattern of axial tracks 85 on the inside surface 95 of the receptacle wall 92 relative to the configuration of the lip 82. Further, the configuration of outward projections 84 and thinned locations 86 may be varied to provide alternative cartridge compatibility matrices defined by the coded lip 82. In combination, the configuration of the coded lip 82 and inside surface 95 of the receptacle wall 92 may be varied and shifted relative to each other to provide a unique cartridge compatibility matrix for any given filter assembly including a base and cartridge. Each cartridge compatibility matrix comprises elements that block incompatible cartridges lacking complementary structures from reception and mating with the base.

With reference to FIGS. 12 and 13, the collar 100 includes a pair of diametrically opposed spiral followers 108 that integrally extend inwardly from the collar 100. The followers 108 are dimensioned and positioned for engagement with the ramps 88 on the base component 80. The followers 108 slidably engage and ascend the ramps 88 upon alignment and angular rotation of the collar 10 relative to the base component 80 and received cartridge 10. The inwardly projecting annular shoulder 102 of the collar 100 bears against the radially projecting roll seam 16 of the cartridge 10 to releasably lock the cartridge 10 to the base component 80.

A spring (or other resilient element not shown) in the base receptacle 87 biases the cartridge 10 and collar 100 away from the base component 80 to maintain the collar followers 108 in a locked position over the beveled end 88a of the ramps 88. This mounting system requires that the axially projecting coded lip 82 of the base component 80 be received in the annular space 20 with room for axial movement to accommodate compression and partial release of the resilient element as the collar thread 108 rides up and over the thread 88 of the base. A rigid abutment of the cartridge roll seam 16 against the lip 82 of the base that prevents the necessary axial movement of the cartridge 10 relative to the base component 80 will prevent complete rotation of the collar 100 to its locked position.

The inwardly projecting annular shoulder 102 of the collar 100 includes a plurality of locations 103 where the lip and adjacent structure is recessed or lip material is removed to accommodate the shape 13 (an outward deflection best seen in FIG. 1) of the cartridge housing second section 14 adjacent the outward deformation of the roll seam 16 for each retention tab 24. In the illustrated embodiment, the collar is provided with six locations 103 where lip material is removed. The six locations 103 correspond to the two possible engaged positions of the collar 100 relative to the base component 80 and the received filter cartridge 10. The outward deflections 13 of the housing second section fit into three of the six locations 103, further enhancing the security of the collar 100 in its locked position relative to the cartridge 10 and the base component 80 by resisting unintentional reverse rotation of the collar 100 relative to the received cartridge 10.

A filter cartridge lacking outwardly displaced portions 24 of the roll seam 16 complementary to the outward projections 84 on the axially projecting coded lip 82 of the base component 80 will be blocked from axial reception and mating with the base. Similarly, filter cartridges including inward deformations of the roll seam will be rejected by a base whose axially projecting lip 82 does not include locations 86 where lip material has been removed to accommodate them. By axial reception and mating with the base, it is meant that the grommet 30 carried by the housing first section 12 receives the axial conduit 88 of the base component and the lip 82 of the base is received in the annular space 20 of the cartridge with room to move axially during rotation of the collar 100 to its locked position. Thus, the configuration of the axially projecting coded lip 82 defines a cartridge compatibility matrix that codes the base component 80 for a cartridge 10 having a particular shape of annular space 20 (as defined by deformations 24, 22 of the roll seam).

A further aspect of the present invention contemplates a filter cartridge compatibility matrix comprising the roll seam retention tabs 24 and inward displaced segments 22 as described above and further including radial protrusions 28 of the cartridge housing end cap 12. The inside surface 95 of the receptacle wall 92 of a filter base component 80 may include axial tracks 85 complementary to a pattern of radial protrusions 28 from the cartridge housing end cap 12. The tracks 85 may be molded and/or machined on the inner surface 95 of the receptacle wall of the base component 80. A filter cartridge including an incompatible pattern of radial protrusions will be blocked from axial reception into the receptacle 87. In combination, the configuration of the filter cartridge roll seam 16 and received cartridge housing end cap 12 may be used to ensure filter compatibility and a particular installed configuration of the filter cartridge 10 relative to the base component 80.

While preferred embodiments of the present invention have been set forth for the purposes of illustration, the foregoing descriptions should not be deemed a limitation of the invention herein. Accordingly, various modifications, adaptations and alternatives may occur to one skilled in the art without departing from the spirit and the scope of the present invention.

What is claimed is:

1. A filter assembly comprising:
    a filter cartridge comprising:
        a filter element extending between axially separated first and second ends;
        a housing end cap defining a portion of a cylindrical space and supporting the first end of the filter element, said housing end cap having a first end defining an axial opening, a generally cylindrical side wall extending from the first end to a second end including a U-shaped bend; and
        a housing second section defining a portion of the cylindrical space, said housing second section having a first end joined to the housing end cap second end by a roll seam, the second end of the housing second section surrounding the second end of the filter element,
        wherein said roll seam is radially spaced from the side wall of the housing end cap to define an annular space, said annular space comprising portions having first and second radial widths relative to the side wall, said first radial width being smaller than said second radial width; and
    a base for mounting said filter cartridge to filter a flow of fluid delivered to and retrieved from said filter cartridge through said base, said base comprising:
        a receptacle wall defining a generally cylindrical receptacle, said wall having inside and outside surfaces and terminating in a lip, said outside surface including outwardly projecting first engagement structures, said lip configured for axial reception into said annular space and including a plurality of outwardly projecting keys corresponding to those portions of the annular space of said second radial width; and
        a hoop-like collar having a first end configured to pass over said cartridge second section, an interior surface including inwardly projecting second engagement structures complementary to said first engagement structures, and a second end including an inwardly projecting annular shoulder engagable against the radially projecting roll seam of the filter cartridge,
    wherein said cartridge is axially received in said base with said housing end cap axially received in said receptacle, said lip axially penetrating said annular space and said collar is axially installed over said cartridge second section bringing said shoulder to bear axially against said roll seam and said collar is rotated relative to said base and cartridge whereby said second engagement structures mate with said first engagement structures to releasably retain the cartridge to the base in a substantially fixed axial and rotational relationship.

2. The filter assembly of claim 1, wherein said annular space comprises at least one portion having a third radial width less than said first radial width and said lip comprises a location where lip material is removed to accommodate the reduced third radial width, said location being dimensioned and positioned to permit axial reception of said lip into said space.

3. The filter assembly of claim 2, wherein said annular space comprises three uniform portions of said second radial width, said three uniform portions being equiangularly distributed about a circumference of the cartridge and said keys are complementary to said three uniform portions.

4. The filter assembly of claim 3, wherein said annular space comprises three uniform portions of said third radial width, said three uniform portions at said third radial width being diametrically opposite each of said three uniform portions of said second radial width and said lip comprises locations where lip material is removed in a pattern complementary to said three uniform portions at said third radial width.

5. The filter assembly of claim 1, wherein said annular space comprises three uniform portions of said second radial width, said three uniform portions being equiangularly distributed about a circumference of the cartridge and said are keys complementary to said three uniform portions.

6. The filter assembly of claim 1, wherein said first engagement structures comprise diametrically opposed spiral ramps axially separated from said lip and distinct from said keys.

7. The filter assembly of claim 1, wherein the inside surface of said receptacle wall defines at least one axial track, said track comprising an axially uniform radially outward extension of said receptacle extending through an inside diameter of said lip.

8. A base for mounting a filter cartridge, said base comprising:
    a header portion defining fluid flow passages for delivery of fluid to be filtered to and retrieval of filtrate from a filter cartridge receivable in the base;
    a receptacle wall integrally axially projecting from said header portion to define a generally cylindrical receptacle, said receptacle wall having an outside surface including diametrically opposed spiral ramps, an axial terminus of said receptacle wall including a coded lip axially spaced from said header portion and from said spiral ramps, said coded lip including a plurality of radially outwardly projecting keys.

9. The base of claim 8, wherein said coded lip comprises locations where lip material is removed such that said lip defines a void projecting radially inwardly of the outside surface of the receptacle wall, said locations being angularly offset from said keys.

10. The base of claim 8, wherein said plurality of keys comprises three substantially uniform keys equiangularly arranged around said coded lip.

11. The base of claim 10, wherein said coded lip comprises three locations where lip material is removed such that said lip defines a void projecting radially inwardly of the outside surface of the receptacle wall, each of said three locations being diametrically opposed to one of said keys.

12. The base of claim 8, wherein said receptacle wall includes an inside surface and said inside surface defines at least one axial track, said track comprising an axially uniform radially outward extension of said receptacle extending through an inside diameter of said coded lip.

13. A base component for axially receiving a filter cartridge, said base component comprising:

a receptacle wall axially projecting from said base component to define a generally cylindrical cartridge receptacle, said receptacle wall having inside and outside surfaces, said outside surface including diametrically opposed spiral ramps, said receptacle wall axially terminating in a coded lip axially separated from said ramps, said coded lip comprising:

a plurality of angularly spaced keys, each key comprising a radially outward projection of said coded lip; and at least one location where said coded lip defines a void extending radially inwardly of the outside surface of said receptacle wall, said at least one location being angularly spaced from each of said keys.

14. The base component of claim 13, wherein said plurality of keys comprises three substantially uniform equiangularly spaced radially outward projections of said coded lip.

15. The base component of claim 14, wherein said at least one location comprises three locations, each of said three locations diametrically opposed to each of said three radially outward projections of said coded lip.

16. The base component of claim 13, wherein the inside surface of said receptacle wall defines at least one axial track, said track comprising an axially uniform radially outward extension of said receptacle extending through an inside diameter of said coded lip.

* * * * *

UNITED STATES PATENT AND TRADEMARK OFFICE
CERTIFICATE OF CORRECTION

| | |
|---|---|
| PATENT NO. | : 6,911,143 B2 |
| APPLICATION NO. | : 10/284686 |
| DATED | : June 28, 2005 |
| INVENTOR(S) | : Janik |

Page 1 of 1

It is certified that error appears in the above-identified patent and that said Letters Patent is hereby corrected as shown below:

Column 10:

Line 39, after "said" delete "are".

Line 40, after "keys" insert --are--.

Signed and Sealed this

Twenty-fifth Day of March, 2008

JON W. DUDAS
*Director of the United States Patent and Trademark Office*